United States Patent
Koehler et al.

(10) Patent No.: US 8,215,662 B2
(45) Date of Patent: Jul. 10, 2012

(54) SYSTEM AND METHOD FOR COUPLING MULTIPLE CARTS

(75) Inventors: Randal W. Koehler, Ridgefield, WA (US); Matthew John Carney, Portland, OR (US)

(73) Assignee: Pedigo Products, Inc., Vancouver, WA (US)

( * ) Notice: Subject to any disclaimer, the term of this patent is extended or adjusted under 35 U.S.C. 154(b) by 448 days.

(21) Appl. No.: 12/576,071

(22) Filed: Oct. 8, 2009

(65) Prior Publication Data

US 2010/0109268 A1     May 6, 2010

Related U.S. Application Data

(60) Provisional application No. 61/111,635, filed on Nov. 5, 2008.

(51) Int. Cl.
- *B62B 3/14* (2006.01)
- *B60D 1/46* (2006.01)
- *B60D 1/54* (2006.01)
- *B61G 3/00* (2006.01)
- *B61G 1/00* (2006.01)

(52) U.S. Cl. ............ 280/656; 280/79.11; 280/651; 280/490.1; 280/491.3; 213/88; 213/175

(58) Field of Classification Search ........... 280/656, 280/789, 30, 33.991, 651, 79.11, 491.1, 491.3, 280/491.4, 491.5; 213/75 R, 77, 78, 88, 213/175

See application file for complete search history.

(56) References Cited

U.S. PATENT DOCUMENTS

| | | | | |
|---|---|---|---|---|
| 1,610,902 A * | 12/1926 | Tomlinson | | 280/481 |
| 2,916,301 A * | 12/1959 | Cushman | | 280/491.4 |
| 6,550,794 B1 * | 4/2003 | Spindel et al. | | 280/79.11 |
| 2005/0073133 A1 * | 4/2005 | Dufty | | 280/656 |
| 2005/0206106 A1 * | 9/2005 | Labadie et al. | | 280/79.11 |
| 2006/0103094 A1 * | 5/2006 | Wiff et al. | | 280/79.11 |
| 2006/0279054 A1 * | 12/2006 | Chung et al. | | 280/79.11 |
| 2009/0085315 A1 * | 4/2009 | Meers et al. | | 280/33.992 |

* cited by examiner

*Primary Examiner* — John R Olszewski

(74) *Attorney, Agent, or Firm* — Davis Wright Tremaine LLP (57) ABSTRACT

A system for engagement and disengagement of carts to form a train of multiple carts. Each cart has a spring-loaded hitch that is held in a storage position when the carts are disengaged. A lever coupled to the hitch is operated to position the hitch for insertion into a receiver pocket of the next cart. A leading edge of the hitch deflects a spring-loaded lockpin. An angled guide member positions the hitch vertically within the pocket so that the lockpin comes into alignment with an aperture in the hitch. When aligned, the lockpin snaps into place and engages the aperture to lock the carts together. The close tolerance of the hitch within the pocket prevents transverse articulation of adjacent carts. Structures within the hitch and the pocket allow slight rotation in a longitudinal articulation axis about the lockpin and torsional articulation of the hitch within the pocket.

13 Claims, 9 Drawing Sheets

SYSTEM AND METHOD FOR COUPLING MULTIPLE CARTS

BACKGROUND OF THE INVENTION

1. Field of the Invention

The present invention is directed generally to techniques for assembling carts and, more particularly, a technique for assembling carts in a manner that restricts certain degrees of motion.

2. Description of the Related Art

Multiple carts are often transported together by coupling two or more carts together to form a tandem train of carts. Conventional cart-coupling systems may utilize a pin held in place by gravity, or a portion of a first cart to rest on a portion of a second cart to be held in place by gravity to couple the carts together. However, such a design may fail when tandem carts are pushed or pulled over an uneven surface, such as a surface with a threshold.

In addition, multiple carts in tandem that are pushed from behind sometimes encounter difficulties when the first cart in the multi-cart assembly begins to stray left or right. Such stray movement may cause the entire multi-cart assembly to veer from the desired direction and require time-consuming correction to adjust the direction of the carts. Therefore, it can be appreciated that there is a significant need for a cart coupling system that will securely couple carts together and allow certain degrees of movement while restricting other degrees of movement. The present disclosure describes a system that provides this, and other advantages, as will be apparent from the following detailed description and accompanying figures.

DETAILED DESCRIPTION OF THE INVENTION

The present disclosure is directed to a system and method for coupling two or more carts together in a tandem arrangement to form a train of carts. In general, disclosed embodiments include a cart coupling system and method that create a train of carts that allows and maintains maneuverability of the cart train over uneven surfaces while preventing buckling of the cart train as the train is moved.

For proper maneuverability of the cart train, the disclosed coupling system forms a cart train that may move over obstacles, such as uneven floors, elevator or door thresholds, up and down ramps, and the like, while maintaining the geometry of the cart train to facilitate pushing or pulling. In particular, pushing of carts, either manually or using a motorized system, requires that the cart train be maintained in a straight line.

Figure 1:
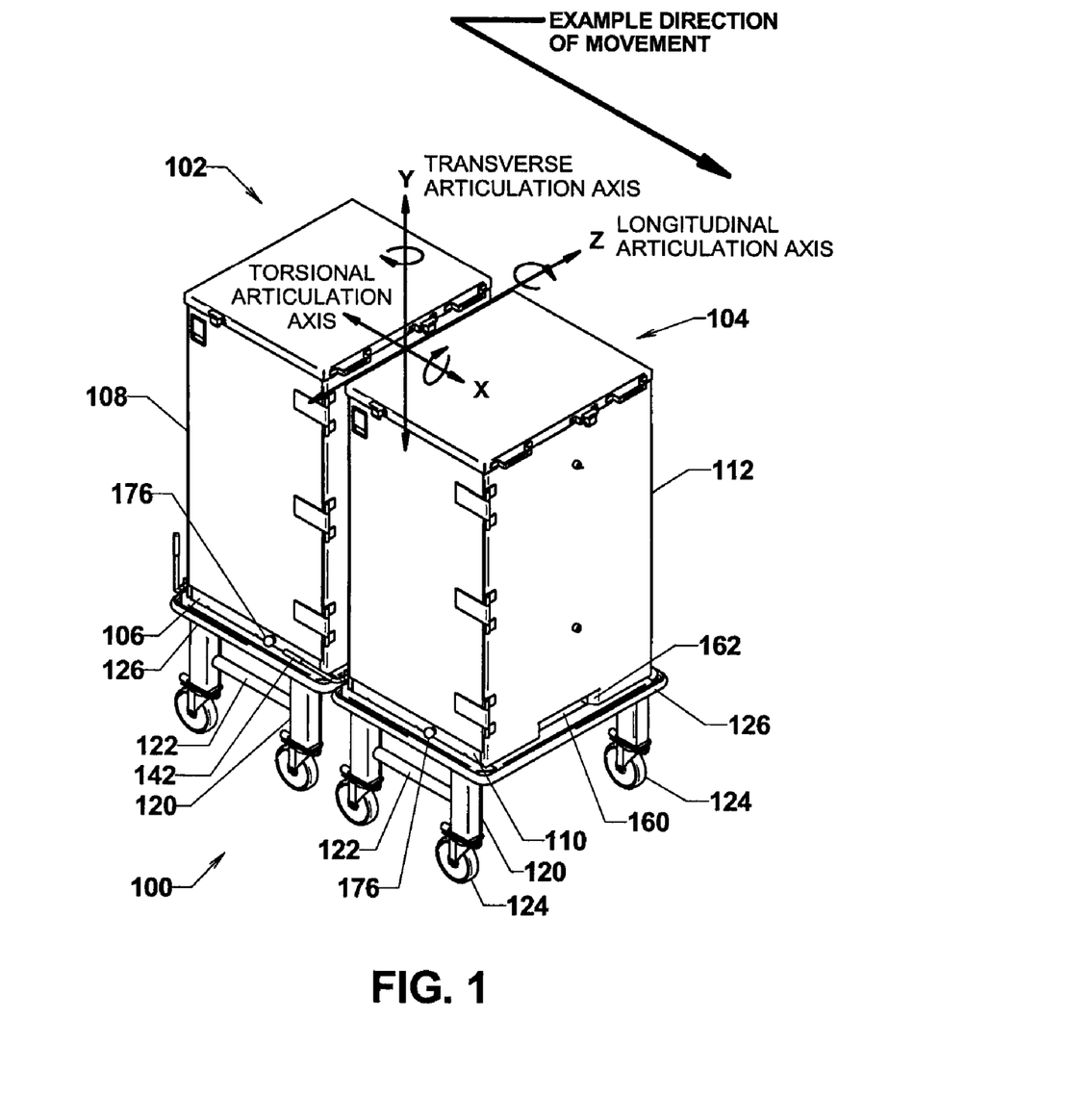
FIG. 1 is a perspective view of two carts in a multiple cart assembly coupled together in accordance with present teachings.

FIG. 1 illustrates a system 100 having a first cart 102 and a second cart 104. The first cart 102 is constructed on a first cart frame 106 and includes a first cart housing 108. Similarly, the second cart 104 includes a second cart frame 110 and a second cart housing 112. FIG. 1 also illustrates lower frame members 120 on each of the carts 102-104 as well as other conventional components, such as cross-support members 122 and wheels 124. In addition to the rotational capability of the wheels, the wheels can swivel 360 degrees on the wheel casters. In addition, either the right, left, or both wheel casters may be locked. By locking the wheel casters in the front of the cart assembly, the train may be locked in the leading direction to facilitate steering down a straight hallway. The construction and operation of the lower frame members 120, cross-supports 122 and wheels 124 are known to those of ordinary skill in the art and need not be described in greater detail herein. Although FIG. 1 illustrates a particular shape of housing, those skilled in the art will appreciate that the coupling mechanisms described below are not limited by the particular size or shape of the cart housing 108. The cart housing 112 may have different overall dimensions than the cart housing 108 so long as the coupling mechanisms, described below, are compatibly positioned.

The cart housings 108 and 112 may be adapted for the particular service task. For example, the carts 102-104 could be used in a hospital setting to deliver meals to a hospital wing. In such an implementation, the cart housings 108 and 112 may include a number of interior slots (not shown) to hold individual food trays. In another embodiment, the carts 102-104 may deliver clean linens from a hospital laundry to individual floors. In this case, a different internal arrangement may be used to hold and organize the clean linens. In other industrial settings, the carts 102-104 may be configured to deliver parts for use in a construction assembly line. The internal configuration of the carts 102-104 may also be altered based on the size of the carts. Thus, one skilled in the art can appreciate that the carts 102-104 may have a variety of different implementations for the cart housings 108 and 112. However, the coupling mechanisms described below may be utilized for a variety of industrial applications.

As described above, it is desirable to allow a cart train to have freedom to rotate about certain axes while restricting other forms of motion. To better appreciate the operation of the coupling mechanisms described herein, FIG. 1 illustrates three-dimensional axes of articulation, which are defined as follows:

X-Axis: Torsional Articulation
Y-Axis: Transverse Articulation
Z-Axis: Longitudinal Articulation To maintain proper geometry of the cart system while in motion, the coupling mechanisms described below allow for limited articulations about the X- and Z-axes, while restricting articulation about the Y-axis. Permitting a limited amount of articulation in the Z-axis or the longitudinal articulation axis allows a train of carts to successfully navigate an up or down ramp where a leading cart is no longer rolling on the same plane as a trailing cart.

Permitting limited articulation in the X-axis or torsional articulation axis allows the carts 102-104 to go over a bump or successfully navigate uneven surfaces. If no movement in this axis is permitted, a condition sometimes occurs where the wheels of a cart (e.g., the cart 102) come off the floor when moving over an uneven surface. Such an undesirable condition may affect tracking, stability, and control of the system 100. The limited movement in the X-axis or torsional articulation axis permitted by the present coupling system allows the cart train to successfully navigate over such uneven surfaces.

Allowing too much movement in the Y-axis or transverse articulation axis may result in buckling or erratic steering of the cart train while being pushed down a straight hallway or moving around a corner. As discussed above, the casters on the wheels 124 can swivel. In an exemplary embodiment, the casters of the wheels 124 may be locked on the first cart in an assembly and the casters on the wheels 124 of the remaining carts in a train can swivel to allow the back end of the train to swing around a corner.

Figure 2A:
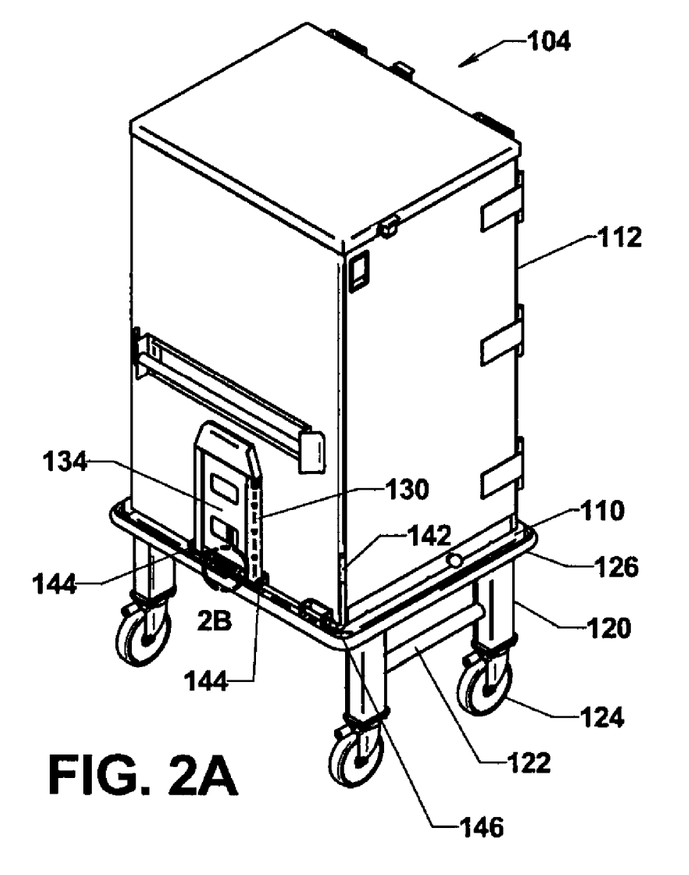
FIG. 2A is a perspective view of one cart showing a coupling member in a storage position.
Figures 4A, 4B:
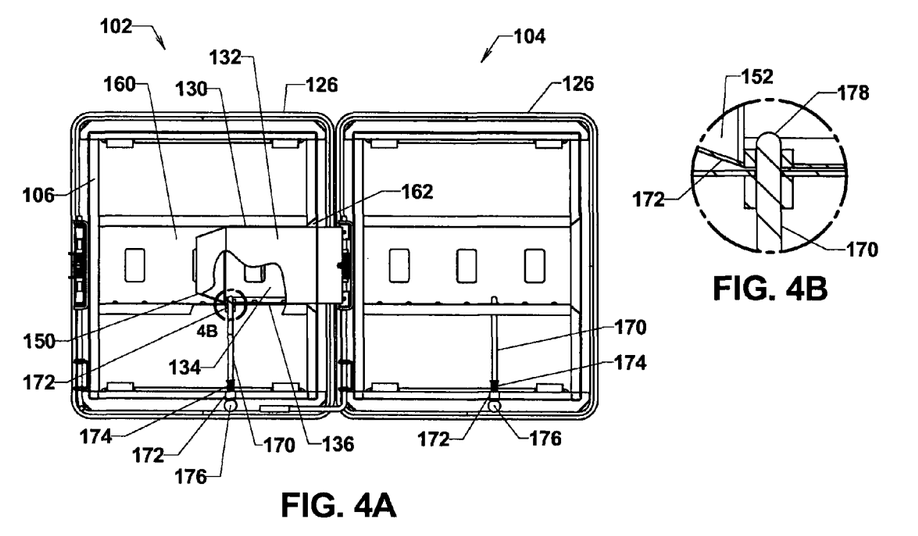
FIG. 4A is a top plan cutaway view illustrating the connection of multiple carts.
FIG. 4B is a close-up of a portion of FIG. 4A illustrating the operation of a lockpin to couple multiple carts together.
Figure 8:
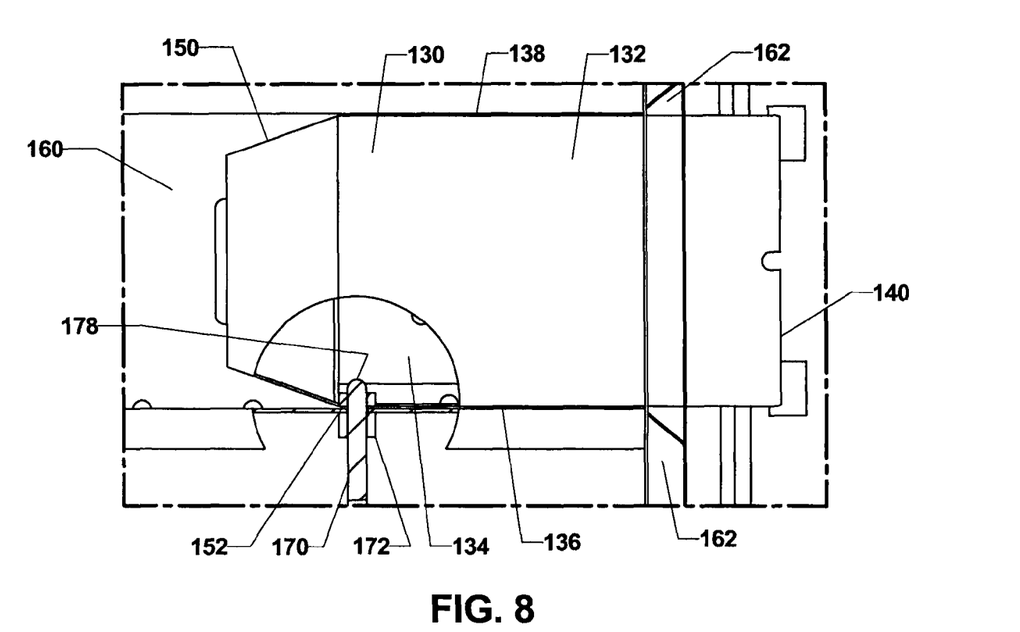
FIG. 8 is a top cutaway view of the coupling elements that limit or eliminate transverse articulation.

Two or more carts may be coupled together in the manner described herein. As illustrated in FIG. 2A, the cart 104 includes a coupling member or hitch 130 rotatively coupled to the cart frame 110. As best seen in FIG. 4A, the hitch 130 is generally rectangular in shape with a top portion 132, a bottom portion 134, and opposing left and right side portions 136-138, respectively, as shown in FIG. 8.

Figure 2B:
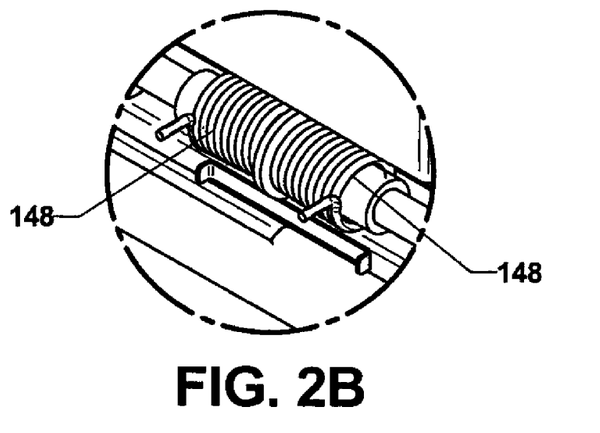
FIG. 2B is a close-up of a portion of FIG. 2A illustrating a mechanism to maintain the coupling member in a storage position.

The hitch 130 includes a connection end 140 which is coupled to a pivoting lever arm 142. The lever arm 142 is rotatively coupled to the frame 110 by mounting brackets 144 and 146, respectively. The brackets 144-146 allow the lever arm 142 to pivot and the hitch 130 rotates with the lever arm 142. As shown in the detail of FIG. 2B, the lever arm 142 includes one or more springs 148 that bias the hitch 130 into a storage position against the cart housing 112. The lever arm 142 is used to overcome the bias of the springs 148 and position the hitch 130 for coupling to another cart (e.g., the cart 102 in FIG. 1).

Figure 3:
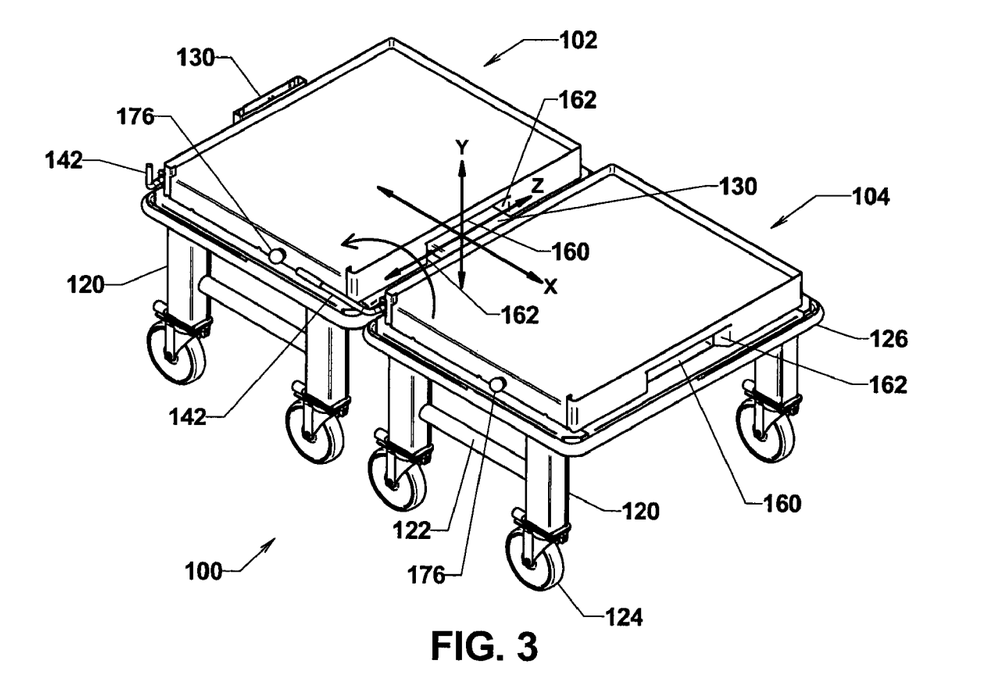
FIG. 3 is a perspective view of the carts of FIG. 1 with the outer skin of the carts removed to better illustrate the connection elements.

To assist in coupling carts together, an insertion end 150 of the hitch 130 is tapered to guide the hitch into a receiver portion or pocket 160 (see FIG. 3). The pocket 160 may include an enlarged mouth 162 to receive the insertion portion 150 of the hitch and to guide it into the pocket. FIG. 3 illustrates the carts 102 and 104 coupled together. For the sake of clarity, the housing 108 and 112 of the carts 102 and 104, respectively, have been removed to better illustrate the coupling mechanism. The width of the pocket 160 is only slightly wider than the width of the hitch 130 to limit movement about the transverse articulation axis (i.e., the 4-axis in FIG. 1) of the carts with respect to each other.

FIG. 4A is a top cutaway view of the carts 102-104 coupled together. As described above, the width of the pocket 160 provides a snug fit for the insertion end 150 of the hitch 130. The tapered end of the insertion portion 150 and the enlarged mouth 162 of the pocket 160 operate in conjunction to guide the hitch 130 into the pocket. The lever arm 142 may be adjusted as the cart 104 is positioned proximate to the cart 102 so that the hitch 130 is vertically aligned with the pocket 160.

When the hitch 130 is fully inserted into the pocket 160, it is held in position by a lockpin 170. The lockpin 170 is supported by bushings 172 in the frame 106 and the pocket 160. The lockpin 170 engages a reinforced aperture 152 in the left side portion 136 of the hitch 130. The lockpin 170 maintains the position of the hitch 130 within the pocket 160 keeps the carts 102-104 coupled together. A spring 174 biases the lockpin 170 toward the pocket 160. At an external end of the lockpin 170, a knob 176 may be pulled by a user to overcome the bias of the spring 174 and pull the lockpin outwardly from the frame 106 to thereby disengage the hitch 130 from the pocket 160.

The tapered end portion 150 of the hitch 130 initially contacts a rounded tip portion 178 of the lockpin 170 and pushes it outwardly, overcoming the force of the spring 174, as the hitch is inserted into the pocket 160. The rounded tip 178 of the lockpin 170 accommodates the deflection of the lockpin by the tapered insertion end 150 of the hitch 130. When the aperture 152 of the hitch 130 is in alignment with the lockpin 170, the force of the spring 174 pushes the rounded tip 178 of the lockpin through the aperture 152 to thereby lock the hitch 130 into the pocket 160 and thereby couple the carts 102-104 together, as illustrated in FIG. 4B.

Figure 5A:
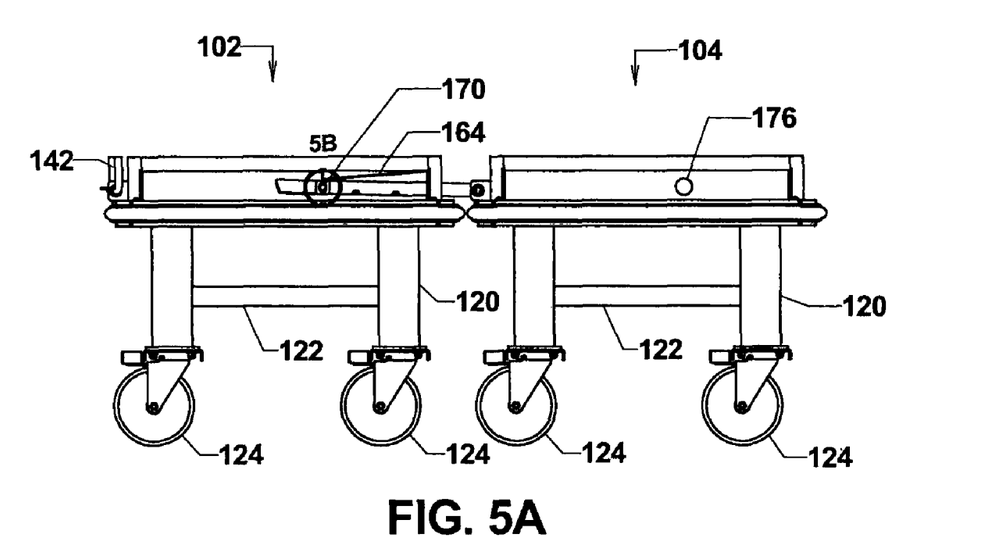
FIG. 5A is a side elevation view with partial cutaway to illustrate the connection elements of multiple carts.
Figure 5B:
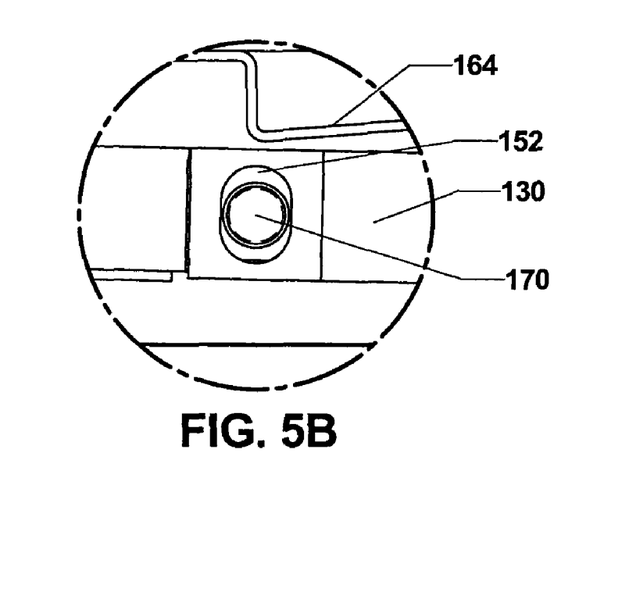
FIG. 5B is a close-up of a portion of FIG. 5A illustrating the insertion of a locking pin to couple carts together and allow for limited torsional articulation.

As best illustrated in FIGS. 5A-5B, an angled guideplate 164 within the pocket 160 guides the hitch 130 into proper alignment within the pocket 160. More specifically, the springs 148 on the hitch 130 biased the hitch in an upward direction. The angled guideplate 164 deflects the hitch 130 in a downward direction and guides the aperture 152 into alignment with the lockpin 170.

Figure 6:
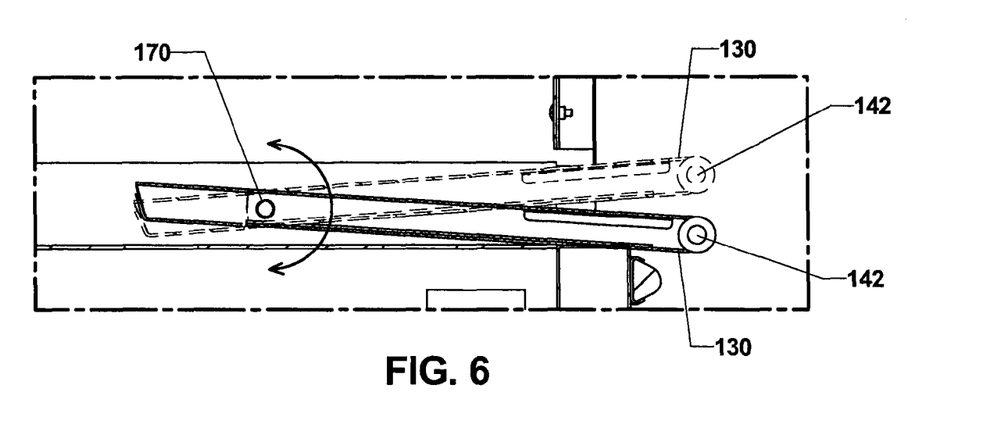
FIG. 6 is a side cutaway view of a portion of carts illustrating rotation of a coupling member to permit longitudinal articulation.
Figure 7A:
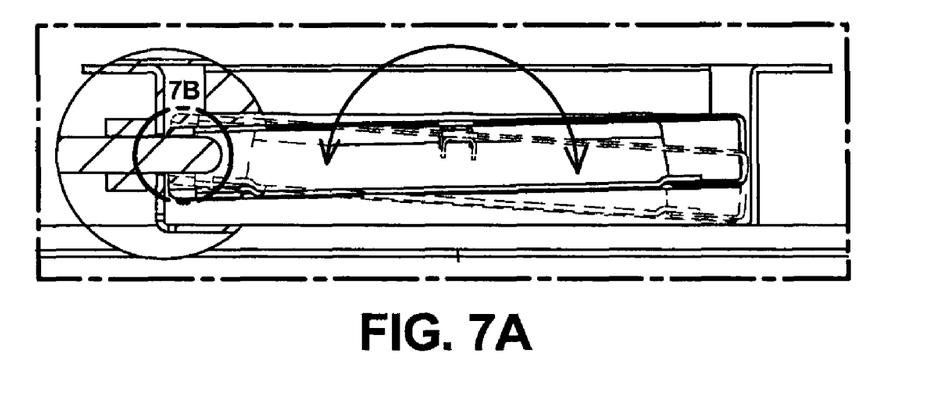
FIG. 7A is a rear cutaway view illustrating the operation of the locking pin of FIG. 5B to permit limited torsional articulation.
Figure 7B:
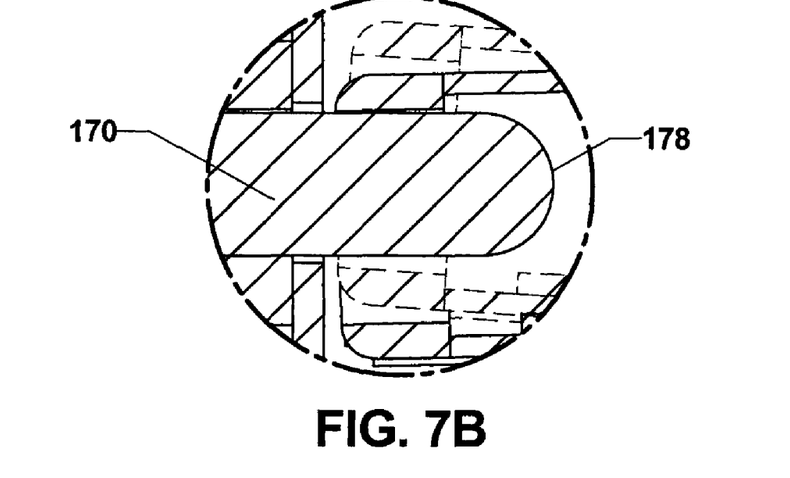
FIG. 7B is a close-up of the locking pin in FIG. 7A illustrating the torsional articulation.

As discussed above, it is desirable to allow limited motion of the carts 102-104 with respect to each other along the longitudinal articulation access (i.e., Z-axis shown in FIG. 1) and the torsional articulation axis (i.e., the X-axis shown in FIG. 1) while limiting motion about the transverse articulation access (i.e., the Y-axis in FIG. 1). FIGS. 6-8 illustrate the operation of the system 100 control movement of the carts 102-104 with these limited amounts of motion.

FIG. 6 illustrates mechanisms that allow limited motion in the longitudinal articulation axis (i.e., the Z-axis shown in FIG. 1).

The height of the pocket 160 is somewhat larger than the thickness of the hitch 130 to permit a limited amount of rotation about the longitudinal articulation axis with the hitch 130 pivoting about the lockpin 170. As illustrated in FIG. 6, the hitch 130 is shown at the two extremes of longitudinal articulation. The two extremes illustrated in FIG. 6 permit approximately 8° of longitudinal articulation or approximately ±4° in each direction from horizontal. This permits the carts 102-104 to go up or down an inclined surface without jamming.

FIGS. 7A-7B illustrate structures that permit a limited degree of rotation about the torsional articulation axis (the X-axis in FIG. 1). As best seen in FIG. 5B, the aperture 152 in the hitch 130 is formed as an elongated slot with the elongation being oriented in a vertical direction transverse to the plane defined by the top portion 132 of the hitch 130. The close tolerance of the aperture 152 in the horizontal direction maintains a tight coupling between the carts 102-104. However, the elongation of the aperture 152 in the vertical direction allows torsional articulation, as illustrated in FIGS. 7A-7B. As the cart 104 encounters an uneven surface, the hitch 130 undergoes torsional articulation within the pocket 160. As the hitch 130 rotates about the torsional articulation axis (i.e., the X-axis in FIG. 1), the lockpin 170 slides up and down within the elongated aperture 152. With the particular dimensions of the pocket 160 and the hitch 130, approximately 5 degrees of torsional articulation is permitted.

As illustrated in FIG. 8, the close clearance fit between the hitch 130 and the pocket 160 does not permit any motion about the transverse articulation axis (i.e., the Y-axis in FIG. 1). Thus, the carts 102-104 are maintained in a straight line as they are moved.

In summary, the cart 104 may be readily coupled to the cart 102 by aligning the hitch 130 with the pocket 160. As the hitch 130 is inserted into the pocket 160, the guideplate 164 guides the aperture 152 of the hitch 130 into alignment with the lockpin 170, the tapered insertion end 150 of the hitch 130 deflects the rounded tip 178 of the lockpin 170 and overcomes the force of the spring 174 until the lockpin is aligned with the aperture 152. The spring 174 causes the lockpin 170 to snap into place within the aperture 152 thus locking the cart 104 to the cart 102. The various structures described above allow approximately ±4° of rotation about the longitudinal articulation axis (the Z-axis in FIG. 1) and approximately 5° of rotation about the torsional articulation axis (the X-axis in FIG. 1) while limiting the carts 102-104 to little or no articulation about the transverse articulation axis (the Y-axis in FIG. 1).

The cart 104 may be decoupled from the cart 102 by pulling the knob 176 axially outward to disengage the lockpin 170 from the aperture 152. The cart 104 may be moved away from the cart 102 thus removing the hitch 130 from the pocket 160. When clear of the pocket 160, the springs 148 automatically rotate the hitch 130 upward back into the storage position illustrated in FIG. 2A.

In this manner, the system 100 allows the hitch 130 to swing up via the springs 148 out of the way into a storage position when the coupling system is disengaged or not in use. A user can couple or decouple the carts without the user's hands being exposed to the tight clearances between the carts. A user may couple the carts together by positioning the hitch 130 for insertion into the pocket 160. The carts are automatically locked together when the lockpin 170 is deflected by the tapered insertion end 150 of the hitch 130 until it engages the aperture 152. The carts are easily decoupled by pulling on the knob 176 to disengage the lockpin 170 from the aperture 152 rather than by any disengagement mechanism between the carts.

In an exemplary embodiment each cart has both the hitch 130 and the pocket 160. This allows multiple carts to be coupled together. At the beginning or end of the train of carts, a drive mechanism may be coupled to the train to provide a power drive for the train of carts. In an exemplary embodiment, the drive mechanism may include the hitch 130 to couple to the system 100 to push the cart train from behind. Alternatively, the drive mechanism may include the pocket 160 to receive the hitch 130 from the front car of a cart train to accommodate pulling of the cart train.

Figure 9:
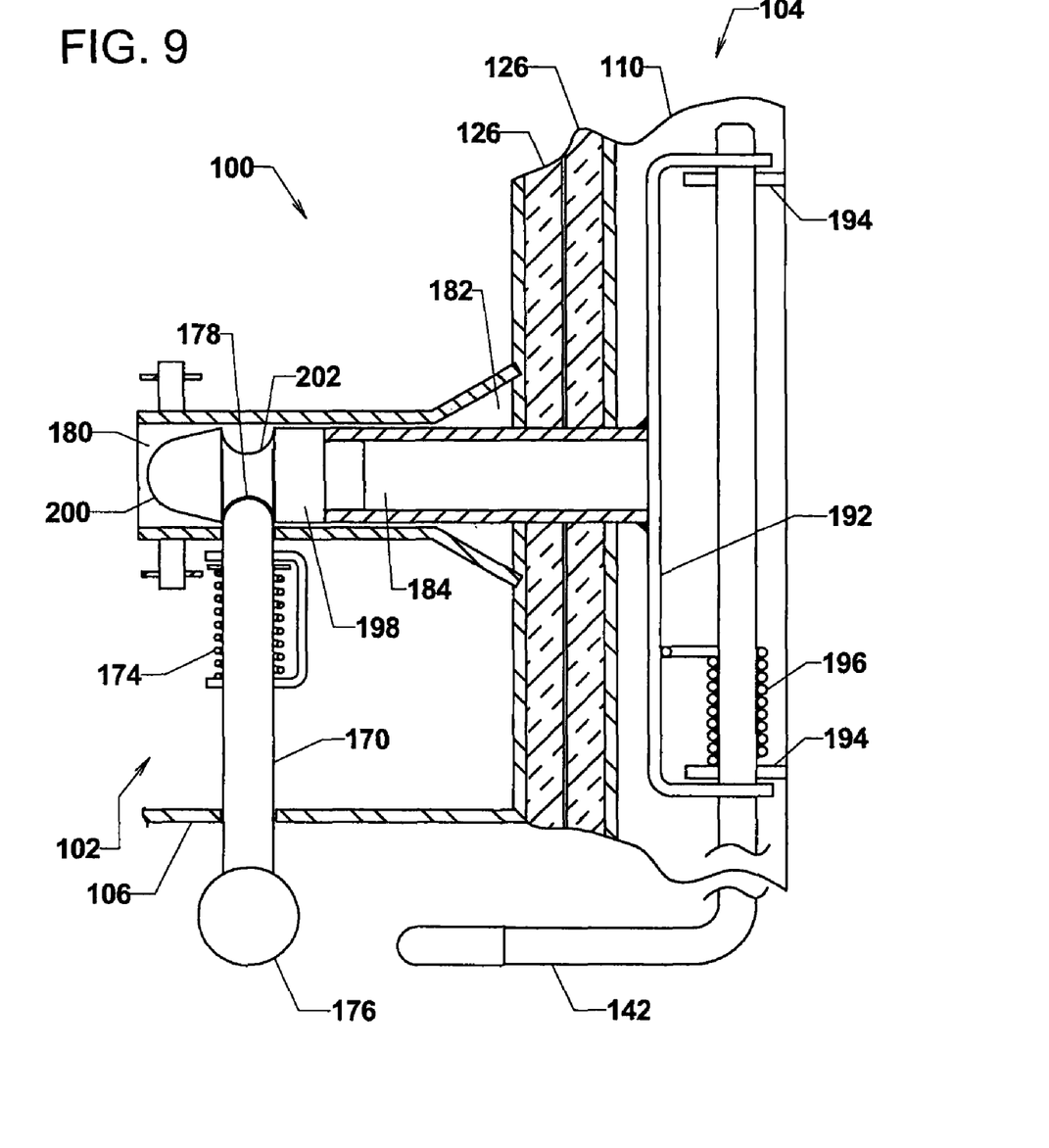
FIG. 9 is a top cutaway view of an alternative embodiment of a cart coupling system, which allows limited transverse and longitudinal articulation, but full torsional articulation.

FIG. 9 illustrates an alternative embodiment of the coupling system 100. In this embodiment, a pocket 180 functions in a manner similar to that described above with respect to the pocket 160 (see e.g., FIG. 3). However, instead of the rectangular shape with a wide opening, as illustrated in FIG. 3, the pocket 180 has a round cross-sectional shape. An enlarged mouth 182 serves to aid in directing the coupling mechanism from another cart into the pocket 180. A coupling member or hitch 184 is sized for insertion into the pocket 180.

The hitch 184 functions in a manner similar to the hitch 130 (see e.g., FIG. 1) to couple multiple carts. Unlike the hitch 130, which is generally wide and flat, the hitch 184 has a round cross-section to fit within the pocket 180. The hitch 184 may be formed from round bar stock or tubing. At a first end, the hitch 184 is fastened to a mounting bracket 192. In an exemplary embodiment, the hitch 184 may be welded to the mounting bracket 192. Other conventional forms of attachment, known in the art, may be used to couple the hitch 184 to the mounting bracket 192.

The mounting bracket is formed with holes sized to receive the lever arm 142. The lever arm 142 also passes through support brackets 194 to thereby couple the mounting bracket 192 and hitch 184 to the frame 110 of the cart 104. A spring 196 urges the hitch 182 into a vertical orientation adjacent to the cart housing 112, in a manner similar to that illustrated in FIG. 2A.

At a second end of the hitch 184, a terminal portion of the hitch is formed by a plug 198. As illustrated in FIG. 9, the plug 198 is secured within a round tube opening formed in an end portion of the hitch 184. The plug 198 may be press-fit into the opening or may be secured using known technology such as welding, riveting, nuts and bolts or other conventional fastener technology. Alternatively, the plug 198 may be held in place by conventional adhesive materials.

The plug 198 has a rounded tip 200, which serves to engage the rounded tip 178 of the lockpin 170 as the hitch 184 is inserted into the pocket 180. The force of insertion applies pressure from the rounded tip 200 to overcome the force of the spring 174, which deflects the lockpin 170 to thereby allow insertion of the hitch 184. A groove 202 in the plug 198 retains the hitch 184 within the pocket 180. As the hitch 184 is fully inserted into the pocket 180, the lockpin 170 becomes aligned with the groove 202. The spring 174 forces the lockpin into the position illustrated in FIG. 9 to thereby mechanically engage and retain the hitch 184 within the pocket 180.

Although the shape of the hitch 184 in FIG. 9 differs from the shape of the hitch 130 (see e.g., FIG. 2A), the hitch 184 has similar functional aspects that allow a degree of motion of the carts 102-104 in the longitudinal articulation axis (i.e., Z-axis of FIG. 1), but allows full articulation in the torsional articulation axis (i.e., X-axis of FIG. 1) while still limiting motion about the transverse articulation axis (i.e., Y-axis of FIG. 1). The dimensions of the pocket 180 are slightly larger than the dimensions of the hitch 184 in the vertical direction similar to that illustrated in FIG. 6. This allows a limited degree of motion in the longitudinal articulation axis.

The elongated aperture 152 (see FIG. 5B) allows the lockpin 170 to move a limited amount in the vertical direction within the hitch 130, as illustrated in FIG. 7A. Similarly, the groove 202 in the plug 198 permits a similar motion about the torsional articulation axis. For example, as the wheels on one side one cart go over an uneven surface or a bump, that cart will rotate in the torsional articulation axis relative to the other cart. However, the carts remain coupled together because the lockpin 170 can slide within the groove thus permitting movement about the torsional articulation axis while still maintaining the coupling between the carts 102-104. In the embodiment illustrated in FIG. 9, the groove 202 is continuous thereby permitting full torsional articulation. The length of the groove may be limited, or mechanical stops added, to thereby limit the degree of movement about the torsional articulation axis.

The close tolerance fit between the side walls of the pocket 180 and the hitch 184 serve to provide severely limited rotation about the transverse articulation axis (i.e., the Y-axis in FIG. 1). Thus, the alternative embodiment illustrated in FIG. 9 provides a different shape for the pocket 180 and hitch 184 while still providing the limited motion only in the desired rotational axes. Thus, multiple carts may be coupled together utilizing the coupling system 100 designed in accordance with the present teachings. Those skilled in the art will appreciate that other variations may be possible to couple multiple carts together to form a cart train utilizing the present teachings.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A multi-cart system for wheeled carts, comprising:
a first cart having a frame member;
a coupling member on the first cart having a connection end and an insertion end, the first cart coupling member connection end being coupled to the first cart frame member, the first cart coupling member having a generally rectangular shape with a top portion and opposing left and right side portions, the first cart coupling member having a predetermined length and width and a predetermined thickness, the first cart coupling member having an aperture in one of the opposing side portions proximate the insertion end of the first cart coupling member;
a second cart having a frame member;
a receiver portion in the second cart frame member sized to slideably receive the insertion end of the first cart coupling member, the second cart receiver portion having a width corresponding to the first cart coupling member width to thereby permit the insertion of the first cart coupling member into the second cart receiver portion but which limits any transverse articulation of the first cart coupling member in the second cart receiver portion, the second cart receiver portion having a height sufficiently greater than the first cart coupling member thickness to thereby permit longitudinal articulation of the first and second carts with respect to each other; and
a lock pin in the second cart frame member to engage the first cart coupling member aperture when the insertion end of the first cart coupling member is fully inserted into the second cart receiver portion to thereby retain the insertion end of the first cart coupling member within the second cart receiver portion, the second cart lock pin being positioned to move within the first cart coupling member aperture to thereby permit torsional articulation of the first and second carts with respect to each other.

2. The system of claim 1 wherein the insertion end of the first cart coupling member has a tapered terminal end to guide the insertion end of the first cart coupling member into the second cart receiver portion.

3. The system of claim 1, further comprising a hinge element configured to rotatably couple the connection end of the first cart coupling member to the first cart frame member first end.

4. The system of claim 3, further comprising a resilient member coupled to the hinge element to urge the first cart coupling member into a storage position when the first cart coupling member is not inserted into the second cart receiver portion.

5. The system of claim 1 wherein the first cart coupling member aperture is elongated in a direction transverse to the top portion of the first cart coupling member to permit torsional articulation of the first and second carts with respect to each other while maintaining the position of the insertion end of the first cart coupling member in the second cart receiver portion.

6. The system of claim 1, further comprising a resilient member operationally coupled to the second cart lock pin to exert an engagement force on the second cart lock pin and thereby urge the second cart lock pin into engagement with the first cart coupling member aperture.

7. The system of claim 6 wherein the insertion end of the first cart coupling member has a tapered terminal end configured to engage a terminal portion of the second cart lock pin and overcome the engagement force exerted on the lock pin by the resilient member.

8. The system of claim 1, further comprising a guide plate positioned within the second cart receiver portion to engage the first cart coupling member as it is inserted into the second cart receiver portion and thereby guide the first cart coupling member aperture into alignment with the second cart locking pin.

9. The system of claim 8 wherein the guide plate positioned within the second cart receiver portion in an angled orientation to apply a force to the top portion of the first part coupling member.

10. The system of claim 1 wherein the second cart lock pin comprises a release actuator positioned to manually disengage the second cart lock pin from the first cart coupling member aperture to permit the extraction of the first cart coupling member from the second cart receiver portion and thereby separate the first and second carts.

11. The system of claim 1 wherein the first and second frame members are substantially equal in size.

12. The system of claim 1 wherein the second cart receiver portion is positioned in the second cart frame member at frame member first end, the system further comprising:
- a second cart coupling member having a connection end and an insertion end, the second cart coupling member connection end being coupled to the second cart frame member at a second end opposite the second cart frame member first end, the second cart coupling member having a generally rectangular shape with a top portion and opposing left and right side portions, the second cart coupling member having a predetermined length and width and a predetermined thickness, the second cart coupling member having an aperture in one of the opposing side portions proximate the insertion end of the second cart coupling member;
- a third cart having a frame member;
- a receiver portion in the third cart frame member sized to slideably receive the insertion end of the second cart coupling member, the third cart receiver portion having a width corresponding to the second cart coupling member width to thereby permit the insertion of the second cart coupling member into the third cart receiver portion, but which limits any transverse articulation of the second cart coupling member in the third cart receiver portion, the third cart receiver portion having a height sufficiently greater than the coupling member thickness to thereby permit longitudinal articulation of the second and third carts with respect to each other; and
- a lock pin in the third cart frame member to engage the second cart aperture when the second cart coupling member insertion end is fully inserted into the third cart receiver portion to thereby retain the insertion end of the second cart coupling member within the third cart receiver portion, the third cart lock pin being positioned to move within the second cart coupling member aperture to thereby permit torsional articulation of the second and third carts with respect to each other.

13. The system of claim 1 wherein the first cart coupling member connection end is coupled to the first cart frame member at a frame member first end, the system further comprising:
- a third cart having a frame member;
- a coupling member on the third cart having a connection end and an insertion end, the third cart coupling member connection end being coupled to the third cart frame member, the third cart coupling member having a generally rectangular shape with a top portion and opposing left and right side portions, the third cart coupling member having a predetermined length and width and a predetermined thickness, the third cart coupling member having an aperture in one of the opposing side portions proximate the insertion end of the third cart coupling member;
- a receiver portion in the first cart frame member at a second end opposite the first cart frame member first end, the first cart receiver portion being sized to slideably receive the insertion end of the third cart coupling member, the first cart receiver portion having a width corresponding to the third cart coupling member width to thereby permit the insertion of the third cart coupling member into the first cart receiver portion but which limits any transverse articulation of the third cart coupling member in the first cart receiver portion, the first cart receiver portion having a height sufficiently greater than the third cart coupling member thickness to thereby permit longitudinal articulation of the first and third carts with respect to each other; and
- a lock pin in the first cart frame member to engage the third cart coupling member aperture when the insertion end of the third cart coupling member is fully inserted into the first cart receiver portion to thereby retain the insertion end of the third cart coupling member within the first cart receiver portion, the first cart lock pin being positioned to move within the third cart coupling member aperture to thereby permit torsional articulation of the first and third carts with respect to each other.

* * * * *